United States Patent [19]

Reynolds et al.

[11] Patent Number: 4,474,446
[45] Date of Patent: Oct. 2, 1984

[54] FOCAL SENSOR HAVING OPTICAL LOW PASS FILTER

[75] Inventors: George O. Reynolds, Waban; Burton R. Clay, Wayland, both of Mass.

[73] Assignee: Honeywell Inc., Minneapolis, Minn.

[21] Appl. No.: 393,565

[22] Filed: Jun. 30, 1982

[51] Int. Cl.³ .......................... G03B 7/08; G01J 1/42; G02B 5/18; G02B 5/20
[52] U.S. Cl. .................................. 354/402; 354/479; 250/204; 250/237 G; 350/311; 350/162.24
[58] Field of Search ................ 354/25 R, 25 A, 25 N, 354/25 P, 31 F, 59, 402–409, 479, 482; 250/201, 204, 237 R, 237 G; 350/311, 314, 162.11, 162.15, 162.16, 162.24

[56] References Cited

U.S. PATENT DOCUMENTS

| | | | |
|---|---|---|---|
| 3,402,001 | 9/1968 | Fleisher | 350/162.24 X |
| 3,631,360 | 12/1971 | Lehovec | 350/162.16 X |
| 3,904,869 | 9/1975 | Stauffer | 354/25 X |
| 4,048,492 | 9/1977 | Hartmann | 250/237 G |
| 4,132,888 | 1/1979 | Kondo | 354/25 X |
| 4,247,763 | 1/1981 | Stauffer | 350/314 X |

FOREIGN PATENT DOCUMENTS 2082335  3/1982  United Kingdom ................ 250/201

OTHER PUBLICATIONS

"Electronic Focus for Cameras", Stauffer et al., Scientific Honeyweller, vol. 3, No. 1, Mar. 1982, pp. 1–13.

Primary Examiner—William B. Perkey
Attorney, Agent, or Firm—John S. Solakian; Laurence J. Marhoefer

[57] ABSTRACT

A system having a scaled anti-aliasing random phase filter for use in optical imaging systems having a sampled focal plane or an automatic focussing device. The filter is scaled so that it may be placed near the focal plane or automatic focus sensing device, yet produce the effect of an anti-aliasing filter at the exit pupil of the optical system. In one example, the filter includes a scaled hologram of a Sayanagi filter located at the exit pupil. In a second example, the filter includes a scaled double chirped diffraction grating.

20 Claims, 5 Drawing Figures

FOCAL SENSOR HAVING OPTICAL LOW PASS FILTER

BACKGROUND OF THE INVENTION

The present invention relates to anti-aliasing filters for optical systems which sample the scene at a lower frequency than the frequency of the scene content, and to autofocusing devices for any imaging system, particularly those used in single lens reflex ("SLR") cameras.

In SLR cameras, it has become desirable to provide automatic focusing to reduce or eliminate manual focusing errors. One such system uses a "through-the-lens" autofocusing device. In this device, the central portion of the reflex mirror is partially transmitting, such that some of the light which would normally be imaged at the eyepiece, passes through the mirror, and is reflected by a second mirror to a focus sensing device at the camera base. This focusing device consists of a row of micro-lenses which bisect the image plane, a corresponding row of detector pairs beneath them, a charge-coupled device ("CCD") which samples the detector signals, and associated electronic circuitry to determine the position of best focus.

Each micro-lens projects an image of the camera lens exit pupil onto a pair of semicircular detectors, such that each detector "sees" a different portion of the exit pupil and scene. The row of detector pairs are electronically sampled such that all signals from "right-hand" detectors may be compared with the signals from corresponding "left-hand" detectors. When the camera is in focus, the signatures collected by the corresponding detector pairs are identical. If the camera is out-of-focus, the signatures are mismatched and displaced. The degree and direction of focus error is calculated from the signature displacement by a microcomputer in the base of the device.

These systems perform adequately, except when the spatial frequency of the scene content imaged on the detector pairs is higher than the spatial frequency of the detector pairs themselves. In this case the signatures collected by corresponding detector pairs may not match at best focus, resulting in aliasing, or the inability of the system to reach best focus.

Ideally, the problem of aliasing would be solved by placing a filter at the exit pupil of the camera lens to reduce the lens resolution to a value below the spatial frequency of the detectors, thus eliminating the high frequency scene content induced ambiguity. However, placing a filter at the exit pupil or between the focusing lens and the reflex mirror is impractical, since it would both distort the image and reduce the illumination of the film and eyepiece.

It is accordingly a primary object of the present invention to provide a system having an improved filter which eliminates aliasing problems in focusing devices which can be located in a position other than the lens exit pupil.

SUMMARY OF THE INVENTION

The above and other objects of the present invention are achieved by providing an optical imaging system for sampling a scene image at a focal plane wherein the system includes at least one imaging plane, a focussing lens for projecting an image onto the imaging plane, and an image sampling device located substantially on the imaging plane, wherein the image sampling device is coupled for sampling the scene image at a desired frequency. Also included is a double chirped diffraction grating filter, which is placed between the focusing lens and the image sampling device whereby the high frequency content of the scene, which frequency is above the sampling frequency of the image sampling device, is substantially eliminated. Such filter is scaled for the position in which it is located and includes a diffraction grating which has substantially parallel grooves. The size and distribution of these grooves is related to the desired cut-off frequency, i.e., the spatial frequency of the detector pairs. Use of such grooves or stripes enables the filter to be made at less cost. Such grooves or stripes, as stated above, vary in either or both spatial frequency and depth, such that they are "chirped", across the filter aperture in order to prevent well-defined diffraction orders which may give rise to additional aliasing problems.

BRIEF DESCRIPTION OF THE DRAWINGS

The above and other objects of the present invention are achieved in the illustrative embodiment as described with respect to the FIG. in which.

DETAILED DESCRIPTION OF THE PREFERRED EMBODIMENT(S)

Figure 1A:
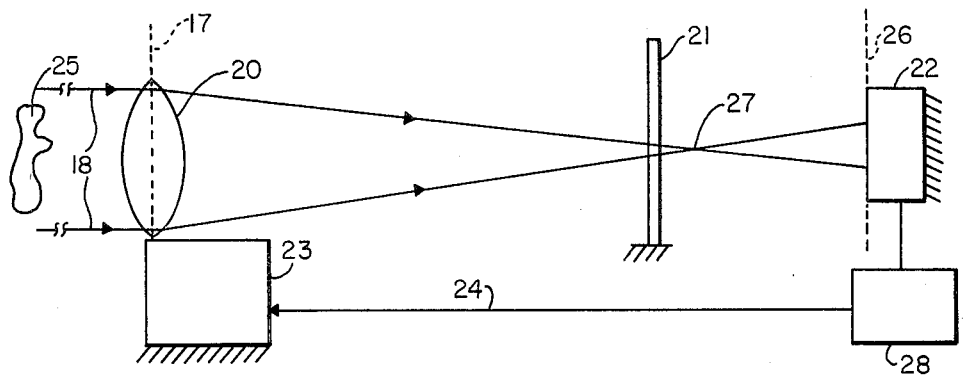
FIGS. 1A and 1B show sideviews of the subject invention in out-of-focus and in-focus positions, respectively.

Referring to FIG. 1, the device of the present invention includes an optical imaging element 20, a scaled filter 21, a focus sensing device 22 with signal processing electronics 28 which generate positioning feedback signal 24, and a motorized focus adjustment 23.

Figure 1B:
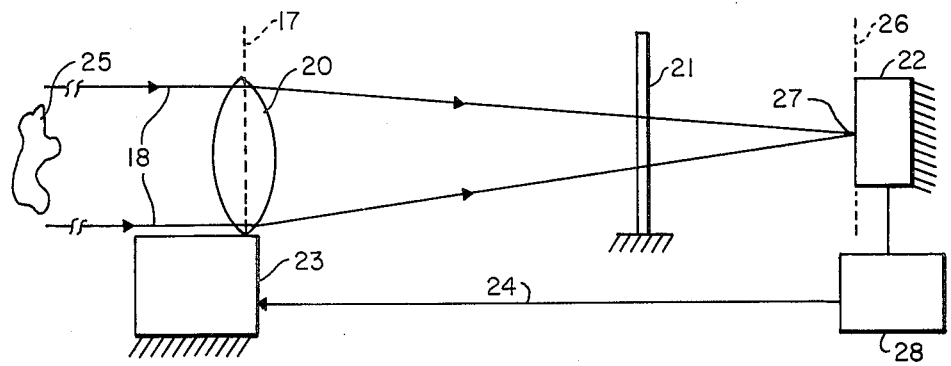

The optical system shown will image object 25 onto focal plane 26. Light ray 18 from object 25 are brought to focus at a point 27 by focusing element 20 of the optical imaging system. When the system is in focus, point 27 lies on the desired imaging plane 26, as shown in FIG. 1B. The face of focus sensing device 22 and any image recording media, for example, photographic films or detector arrays, lie on plane 26. Focus-sensing device 22 may include, for example, a micro-lens/detector array sensor or any image plane sampling device. For an explanation of one (1) type of an electronic focusing device, see the article entitled "Electronic Focus for Cameras", by Norm Stauffer and Denny Wilwerding, Scientific Honeyweller, Volume 3, Number 1, March 1982.

The signal processing electronics 28, in conjunction with focus sensing device 22 generate a feedback signal 24 to the motorized focus adjustment mechanism 23, to move optical focusing element 20 such that focal point 27 lies on focal plane 26.

A random phase filter (for example, a Sayanagi filter, see U.S. Pat. No. 2,959,105) at the exit pupil plane 17 would eliminate aliasing by the focus sensing device 22 by effectively reducing the cut-off frequency of the lens to less than the spatial frequency of the detectors within the focus sensing device. However, because placement of the filter at the exit pupil is generally not possible or practical, the filter 21 may be inserted in the optical train between element 20 and focal plane 26 at a more mechanically expedient position.

Figure 2:
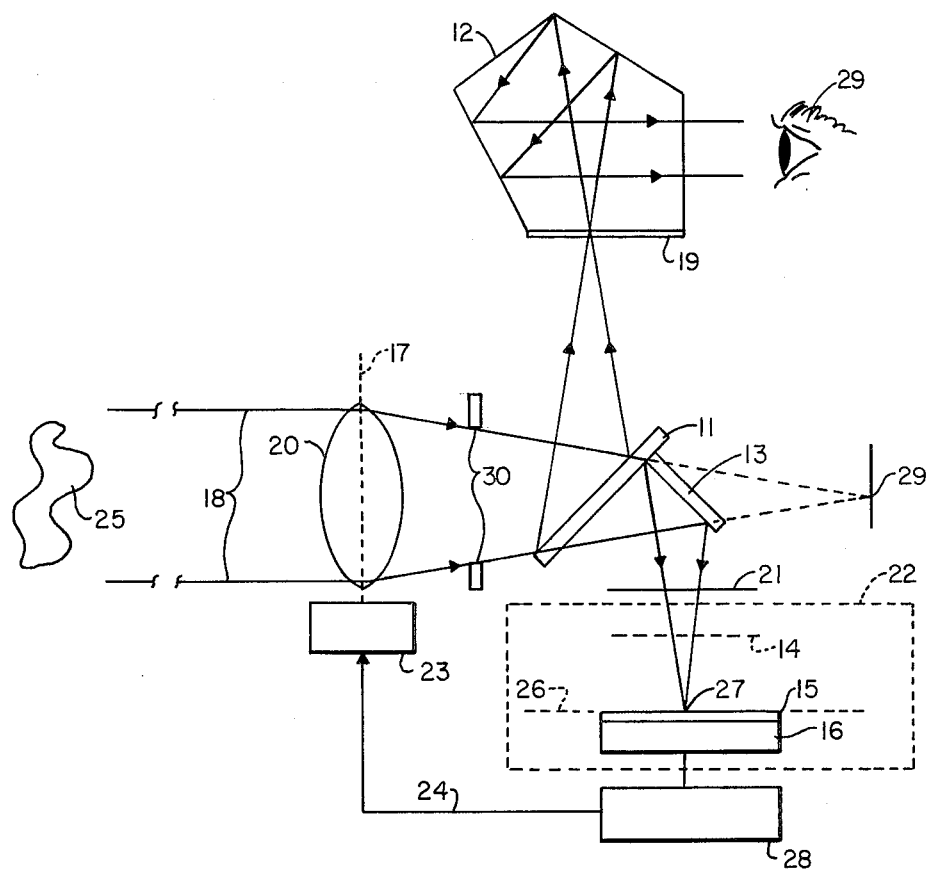
FIG. 2 shows a sideview of the subject invention in place in a single lens reflex camera system with automatic focusing device.

FIG. 2 shows placement of the filter 21 in a SLR camera with a through-the-line automatic focusing device 22. Light rays 18 from an object 25 at infinity enter the optical train of the camera through lens 20, and are focused onto reflex mirror 11.

The central portion of mirror 11 is an optical beam splitter. When the mirror is in the position as shown, a portion of the focused light is reflected onto a sheet of ground glass 19, within pentaprism viewer 12 for observation by the photographer 29. The remaining light is relayed by a second mirror 13 to the detector array 15 of focus sensing device 22. When the mirrors are pivoted or otherwise moved out of the way, the emulsion at film plane 29 is exposed. Ground glass 19, detector array 15 and film plane 29 are located at substantially the same optical path distance from optical element 20.

Focus-sensing device 22 comprises a micro-lens array 14, a matched array of detector pairs 15 which bisect the image plane, and detector sampling electronics 16. Each micro-lens images the exit pupil plane 17 onto a corresponding detector pair with array 15. An electronic sampling device 16 collects the signals from detector array 15. Signal processing electronics 28 determine the degree and direction of the focus error, if any, and generate a feedback signal 24 to focus control 23 which moves lens 20.

The same filtering effect as a random phase filter located in the exit pupil plane 17 may be obtained by placing a properly scaled filter 21 at a specified location between the focal plane 26 and the exit pupil plane 17 as shown in FIG. 2.

In one embodiment, this filter 21 may be fabricated by recording a Fresnel hologram of an appropriate Sayanagi filter located at the exit pupil. The traditional Sayanagi filter, when located at the exit pupil, consists of a transmitting plate on which half-wavelength thick circular areas are randomly placed. The diameter, D, of the raised area is calculated as follows:

$$D = 2.44 wf/P,$$

where w is the wavelength of light being detected by the focus sensor, f is the focal length of the lens 20, and P is the desired cut-off frequency of the filter, which cut-off frequency is less than the spacing frequency of the focus sensor detectors. A hologram of the filter is recorded so that when it is placed at the desired distance from the exit pupil and "read out" from the focus sensor position, the virtual image of the Sayanagi filter appears to be in the camera lens exit pupil. This hologram comprises the scaled filter.

An exact representation of the scaled filter 21 may be obtained by performing a Fresnel transform of the pupil plane filter phase distribution and coordinates. This yeilds a mathematical description of the phase values and coordinates of a new filter to be located at the selected distance from the exit pupil plane 17.

Figure 3A:
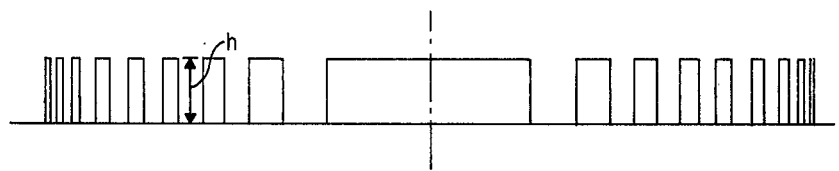
FIGS. 3A and 3B show alternative embodiments of a diffraction grating filter in accordance with the teachings of the present invention.
Figure 3B:
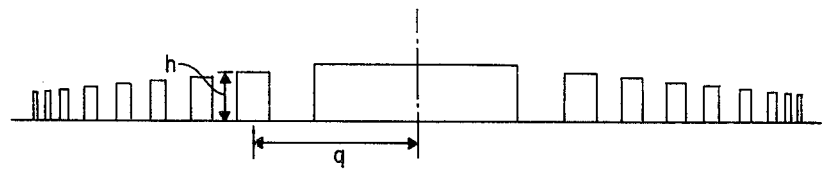

The scaled Sayanagi filter is the optimum radially symmetric anti-aliasing filter. However, since most focus sensing devices use linear detector arrays, a filter which eliminates high frequency scene contact parallel to the focus sensing detector array 15 could also be used. In a second embodiment, a chirped diffraction grating, such as that shown in FIGS. 3A and 3B, is inserted at filter position 21 to suppress the high frequency content of the scene. In a diffraction grating of constant spatial frequency, high order diffraction terms may reinforce high frequency scene content causing beat frequencies which result in aliasing. The chirped diffraction grating eliminates well-defined high-order terms by increasing the grating frequency, thus spreading the high-order diffraction terms outside the field of view of the detector array 15. Because the iris diaphragm 30 of the camera may be wide open or closed down depending on the scene brightness, the chirped filter must be designed so that the lowest grating frequency is on-axis and higher frequency off-axis as the iris diaphragm 30 is opened. As a result, the frequency of the grating must increase symmetrically on either side of center (on-axis) as shown in FIGS. 3A, 3B and 3C, creating a symmetric double chirped diffraction grating.

For a chirped grating at the exit pupil 17, the grating frequency at the filter center, F, is calculated as follows:

$$F = (2.44 wf/P)^{-1},$$

where w is the wavelength at which the system is operating (for example, $0.6 \times 10^{-3}$ mm), P is the desired cut-off frequency (the focus sensor detector array 15 spacing, for example, may be 0.2 mm) and f is the focal length of lens 20 (for example, 50.0 mm). The rate of frequency sweep toward the filter edges is determined empirically. In order to maximize the filter efficiency, the groove depth may also be adjusted as shown in FIG. 3B for the local spatial frequency of the grating. Highest grating efficiency is obtained where the groove depth, h, expressed in terms of Optical Path Difference ("OPD") is:

$$h = 0.36q,$$

where q is the local spatial period of the grating.

To move the chirped filter from the exit pupil plane 17 to a more advantageous position behind reflex mirror 11, for example, to filter position 21, the filter may be scaled geometrically or as described above. Unlike the scaled Sayanagi filter, the scaled chirped filter must be aligned in the optical system such that the gratings are substantially perpendicular to the focus sensor detector array 15.

Numerous objects and advantages of the present invention have been set forth in the foregoing description, together with details of the structure and the functions of the invention, and the novel features thereof are pointed out in the appended claims. The disclosure, however, is illustrative only, and changes may be made in detail, especially in matters of shape, size, and arrangement of parts, within the principles of the invention, to the full extent indicated by the broad general meaning of the terms in which the appended claims are expressed. For example, the constants of 0.36 and 2.44 are illustrative only. The constant 0.36 may have been, for example, in the range of 0.1 to 0.5, however, such constant is selected to determine the diffraction efficiency of the grating. The constant 2.44 may also be selected from a wide range of values, and, more particularly, is a number which depends upon the amplitude distribution of an incident light wave on the focusing lens. Further, the teachings of the present invention may be applied to any type of photographic device, microscopes, telescopes, etc., as well as infrared optical systems.

Having described the invention, what is claimed as new and novel and for which it is desired to secure Letters Patent is:

1. An optical imaging system for sampling a scene image at a focal plane, said system comprising:
   A. at least one imaging plane;
   B. a focusing lens for projecting an image onto said at least one imaging plane;
   C. an image sampling device located substantially on one of said at least one imaging plane, said image sampling device coupled for sampling said scene image at a desired frequency;
   D. a filter having double chirped diffraction gratings, said filter placed between said focusing lens and said image sampling device, whereby the high frequency content of said scene, which frequency is above the sampling frequency of the image sampling device, is substantially eliminated.

2. A device as in claim 1 wherein said image sampling device comprises an automatic focusing device in combination with a means for determining the position of best focus of said focusing lens in order to project a focused image onto said at least one imaging plane.

3. A device as in claim 2 wherein said focusing lens and said imaging plane comprise a single lens reflex photographic device having:
   A. a viewing screen at a first desired imaging plane;
   B. a recording medium at a second desired imaging plane;
   C. a focus sensing device at a third desired imaging plane;
   D. a movable reflex mirror having a partially transmitting central portion, said mirror located between said focusing lens and said first and second imaging planes, such that when the reflex mirror is in a first position, the image created by the focusing lens is displayed on the viewing screen, and when the mirror is in a second position, the image is projected on said recording medium at the second desired imaging plane; and
   E. a second mirror behind said partially transmitting portion of said reflex mirror such that when the reflex mirror is in said first position, light from said focusing lens is relayed through said filter to said focus sensing device at the third desired imaging plane.

4. A device as in claim 2 wherein said focus sensing device comprises:
   A. a linear array of detectors;
   B. a row of micro-lenses corresponding to said array of detectors;
   C. means for collecting and comparing electrical signals from said detectors; and
   D. means of determining the degree and direction of focus error from said electrical signals.

5. A device as in claim 1 wherein said double chirped diffraction grating includes substantially parallel grooves in which:
   A. the grating frequency, F, at the filter center is determined by:

$$F = (kwfP)^{-1},$$

where w is the operating wavelength of said imaging system, P is the desired cut-off frequency of said filter, f is the focal length of said focusing lens, and k is a constant;

B. the spatial frequency of the chirped grating increases substantially symmetrically toward the edges of said filter; and
   C. the depth, h, of each groove is a function of the spatial period, q, of said grooves, determined by:

$$h = Nq,$$

where N is a constant and where q is inversely proportional to said spatial frequency.

6. A device as in claim 5, wherein the constant K is a number which depends upon the amplitude distribution of an incident light wave on the focusing lens and wherein the constant N is a number which is selected to determine the diffraction efficiency of the grating.

7. A device as in claim 3 wherein said double chirped diffraction grating is positioned between said second mirror and said focus sensing device such that the grooves of said grating are substantially perpendicular to the alignment of said linear array of detectors.

8. A device as in claim 7 wherein said filter comprises a scaled symmetrical double chirped diffraction grating having substantially parallel grooves in which:
   A. the grating frequency, F, at the filter center is determined by:

$$F = (kwfP)^{-1},$$

where w is the operating wavelength of said imaging system, P, is the desired cut-off frequency of said filter, f is the focal length of said focusing lens, and K is a constant;

B. the spatial frequency of the chirped grating increases substantially symmetrically toward the edges of said filter; and
   C. the depth, h, of each groove is a function of the spatial period, q, of said grooves, determined by:

$$h = Nq,$$

where N is a constant.

9. A device as in claim 8, wherein the constant K is a number which depends upon the amplitude distribution of an incident light wave on the focusing lens and wherein the constant N is a number which is selected to determine the diffraction efficiency of the grating.

10. A device as in claim 1 wherein the focusing lens comprises an infrared optical system, and the image sensing device comprises an infrared detector array.

11. A device as in claim 1 wherein said double chirped diffraction grating is scaled as a function of its location in said system and which grating has substantially parallel grooves in which:
    A. the grating frequency, F, at the filter center is determined by:

$$F = (kwfP)^{-1},$$

where w is the operating wavelength of said imaging system, P is the desired cut-off frequency of said filter, f is the focal length of said focusing lens, and k is a constant;

B. the spatial frequency of the chirped grating increases substantially symmetrically toward the edges of said filter; and
    C. the depth, h, of each groove is a function of the spatial period, q, of said grooves, determined by:

$$h = Nq,$$

where N is a constant and where q is inversely proportional to said spatial frequency.

12. A device as in claim 11, wherein the constant K is a number which depends upon the amplitude distribution of an incident light wave on the focusing lens and wherein the constant N is a number which is selected to determine the diffraction efficiency of the grating.

13. An optical imaging system for sampling a scene image at a focal plane, said system comprising:
   A. at least one imaging plane;
   B. a focusing lens for projecting an image onto said at least one imaging plane;
   C. an image sampling device located substantially on one of said at least one imaging plane, said image sampling device coupled for sampling said scene image at a desired frequency;
   D. a filter having double chirped diffraction gratings, wherein said gratings have substantially parallel grooves, and wherein said filter is placed between said focusing lens and said sampling device, whereby the high frequency content of said scene, which frequency is above the sampling frequency of the image sampling device, is substantially eliminated;
   E. wherein the grating frequency, F, at the center of said filter is determined by:

$$F=(kwfP)^{-1},$$

where w is the operating wavelength of said imaging system, P is the desired cut-off frequency of said filter, f is the focal length of said focusing lens, and k is a constant;
   F. the spatial frequency of the chirped grating increases substantially symmetrically toward the edges of said filter; and
   G. the depth, h, of said grooves is a function of the spatial period, q, of said grooves, determined by:

$$h=Nq,$$

where N is a constant and where q is inversely proportional to said spatial frequency.

14. An optical imaging system for sampling a scene image at a focal plane, said system comprising:
   A. at least one imaging plane;
   B. a focusing lens for projecting an image onto said at least one imaging plane;
   C. an image sampling device located substantially on one of said at least one imaging plane, said image sampling device coupled for sampling said scene image at a desired frequency;
   D. a filter having double chirped diffraction gratings, said filter placed between said focusing lens and said image sampling device, whereby the high frequency content of said scene, which frequency is above the sampling frequency of the image sampling device, is substantially eliminated;
   E. the grating frequency, F, at the center of said filter is determined by:

$$F=(kwfP)^{-1},$$

where w is the operating wavelength of said imaging system, P is the desired cut-off frequency of said filter, f is the focal length of said focusing lens, and k is a constant;
   F. the spatial frequency of the chirped grating increases substantially symmetrically toward the edges of said filter;
   G. the depth, h, of said gratings is a function of the spatial period, q, of said gratings, determined by:

$$h=Nq,$$

where N is a constant, and where q is inversely proportional to said spatial frequency and further comprising
   H. an automatic focusing device in combination with a means for determining the position of best focus of said focusing lens in order to project a focused image onto said at least one imaging plane.

15. An optical imaging system for sampling a scene image at a focal plane, said system comprising:
   A. at least one imaging plane;
   B. a focusing lens for projecting an image onto said at least one imaging plane;
   C. an image sampling device located substantially on one of said at least one imaging plane, said image sampling device coupled for sampling said scene image at a desired frequency;
   D. a filter having double chirped diffraction gratings, said filter placed between said focusing lens and said image sampling device, whereby the high frequency content of said scene, which frequency is above the sampling frequency of the image sampling device, is substantially eliminated;
   E. the grating frequency, F, at the center of said filter is determined by:

$$F=(kwfP)^{-1},$$

where w is the operating wavelength of said imaging system, P is the desired cut-off frequency of said filter, f is the focal length of said focusing lens, and k is a constant; and
   F. the spatial frequency of the chirped grating increases substantially symmetrically toward the edges of said filter.

16. A device as in claim 15 wherein said image sampling device comprises an automatic focusing device in combination with a means for determining the position of best focus of said focusing lens in order to project a focused image onto said at least one imaging plane.

17. A device as in claim 16 wherein said focusing lens and said imaging plane comprise a single lens reflex photographic device having:
   A. a viewing screen at a first desired imaging plane;
   B. a recording medium at a second desired imaging plane;
   C. a focus sensing device at a third desired imaging plane;
   D. a movable reflex mirror having a partially transmitting central portion, said mirror located between said focusing lens and said first and second imaging planes, such that when the reflex mirror is in a first position the image created by the focusing lens is displayed on the viewing screen, and when the mirror is in a second position, the image is projected on said recording medium at the second desired imaging plane; and
   E. a second mirror behind said partially transmitting portion of said reflex mirror such that when the reflex mirror is in said first position, light from said focusing lens is relayed through said filter to said focus sensing device at the third desired imaging plane.

18. A device as in claim 17 wherein said gratings have a depth, h, which is a function of the spatial period, q, of said gratings, determined by:

$$h = Nq,$$

where N is a constant and where q is inversely proportional to said spatial frequency.

19. An optical imaging system for sampling a scene image at a focal plane, said system comprising:
A. at least one imaging plane;
B. a focusing lens for projecting an image onto said at least one imaging plane;
C. an image sampling device located substantially on one of said at least one imaging plane, said image sampling device coupled for sampling said scene image at a desired frequency;
D. a filter having diffraction gratings, said filter placed between said focusing lens and said image sampling device, whereby the high frequency content of said scene, which frequency is above the sampling frequency of the image sampling device, is substantially eliminated;
E. wherein the grating frequency, F, at the center of said filter is determined by:

$$F = (kwfP)^{-1},$$

where w is the operating wavelength of said imaging system, P is the desired cut-off frequency of said filter, f is the focal length of said focusing lens, and k is a constant; and
F. wherein the spatial frequency of the gratings increases as a function of the position of the gratings from the center of said filter toward the edges of said filter.

20. A device as in claim 19 wherein said gratings have a depth, h, which is a function of the spatial period, q, of said gratings, determined by:

$$h = Nq,$$

where N is a constant and where q is inversely proportional to said spatial frequency.

* * * * *